United States Patent
Chen et al.

(10) Patent No.: US 9,058,673 B2
(45) Date of Patent: Jun. 16, 2015

(54) IMAGE MOSAICKING USING A VIRTUAL GRID

(71) Applicant: ORACLE INTERNATIONAL CORPORATION, Redwood Shores, CA (US)

(72) Inventors: Fengting Chen, Nashua, NH (US); Qingyun Xie, Bedford, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 118 days.

(21) Appl. No.: 13/832,771

(22) Filed: Mar. 15, 2013

(65) Prior Publication Data

US 2014/0270478 A1 Sep. 18, 2014

(51) Int. Cl.
*G06K 9/36* (2006.01)
*G06T 3/40* (2006.01)
*G06T 7/00* (2006.01)

(52) U.S. Cl.
CPC ............. *G06T 3/4038* (2013.01); *G06T 7/0024* (2013.01)

(58) Field of Classification Search
USPC .......................................................... 382/284
See application file for complete search history.

(56) References Cited

U.S. PATENT DOCUMENTS

| 6,137,498 | A  | * | 10/2000 | Silvers ........................ 345/629 |
| 7,177,882 | B2 |   | 2/2007 | Xie et al. |
| 2005/0147322 | A1 | * | 7/2005 | Saed .............................. 382/284 |
| 2006/0104541 | A1 | * | 5/2006 | Baker et al. ................... 382/284 |
| 2012/0201478 | A1 | * | 8/2012 | Schultz et al. ................. 382/284 |
| 2013/0002699 | A1 | * | 1/2013 | Watanabe et al. ............. 345/589 |
| 2014/0029867 | A1 | * | 1/2014 | Giuffrida et al. ............. 382/284 |

OTHER PUBLICATIONS

Oracle., Oracle Spatial, GeoRaster Developer's Guide, 11g Release 2 (11.2) E11827-02), Aug. 2009, pp. 4-139 to 4-146.
Xie et al., Oracle Spatial 11g GeoRaster, An Oracle Technical White Paper, Jun. 2007 pp. 1-22, Oracle Corporation, Redwood Shores, CA.
Data Resource Center, University of Guelph, Merging (Merge/Mosaic) Geospatial Data, Jul. 1, 2010, pp. 1-7.

* cited by examiner

*Primary Examiner* — John Strege
(74) *Attorney, Agent, or Firm* — Kraguljac Law Group, LLC

(57) ABSTRACT

Systems, methods, and other embodiments associated with generating a mosaic image using a virtual grid are described. In one embodiment, a method includes analyzing, by a processor of an apparatus, a boundary of a requested image to determine source images that collectively form an area that includes the requested image. The method also includes generating, by the processor, a virtual grid from coordinates of the source images by identifying edges of the source images from the coordinates to define rows and columns of the virtual grid within the boundary. The rows and columns of the virtual grid define virtual tiles in the virtual grid.

21 Claims, 7 Drawing Sheets

IMAGE MOSAICKING USING A VIRTUAL GRID

BACKGROUND

A mosaic image is an image that is comprised of many smaller images. The smaller images, also referred to as source images, are used to construct the mosaic image since a single image of a whole area of the mosaic image may not be available. Thus, the source images are stitched together to form the mosaic image. However, the source images invariably overlap each other. Consequently, a device that generates the mosaic image reads and writes extra data that is not used for the final mosaic image because the device is not aware of the overlaps. Accordingly, loading and writing the extra data results in reduced performance.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems, methods and other embodiments associated with generating a mosaic image using a virtual grid are described. Mosaic images are often used in circumstances when a single image of a whole area is not available, but smaller images of portions of the area are available. For example, a satellite image is generally an image of a small portion of the globe. That is, a single source image from a satellite may be only a 8 km by 8 km square (or other dimension). However, a requested image may be for an entire county or state. Accordingly, the requested image is formed as a mosaic image that can include thousands of source images that are collectively put together to form the entire mosaic image.

Further consider that the source images are not aligned/formatted in a symmetric grid pattern. For example, even though the source images may have a rectangular shape, many of the source images partially overlap with one or more other source images within an area of the mosaic image. Thus, generating the mosaic image from the source images can lead to difficulties or inefficiencies when all of the source images are read from a database and combined into the mosaic image without regard to the overlaps. For example, duplicate data may be retrieved from the overlapping images, which is inefficient.

Accordingly, in one embodiment, an apparatus generates a virtual grid from coordinates of the source images within a boundary of the mosaic image. The apparatus uses the virtual grid to map where the source images overlap within the boundary. In this way, the apparatus uses the virtual grid to identify where overlaps exist between sources images with increased efficiency.

Figure 1:
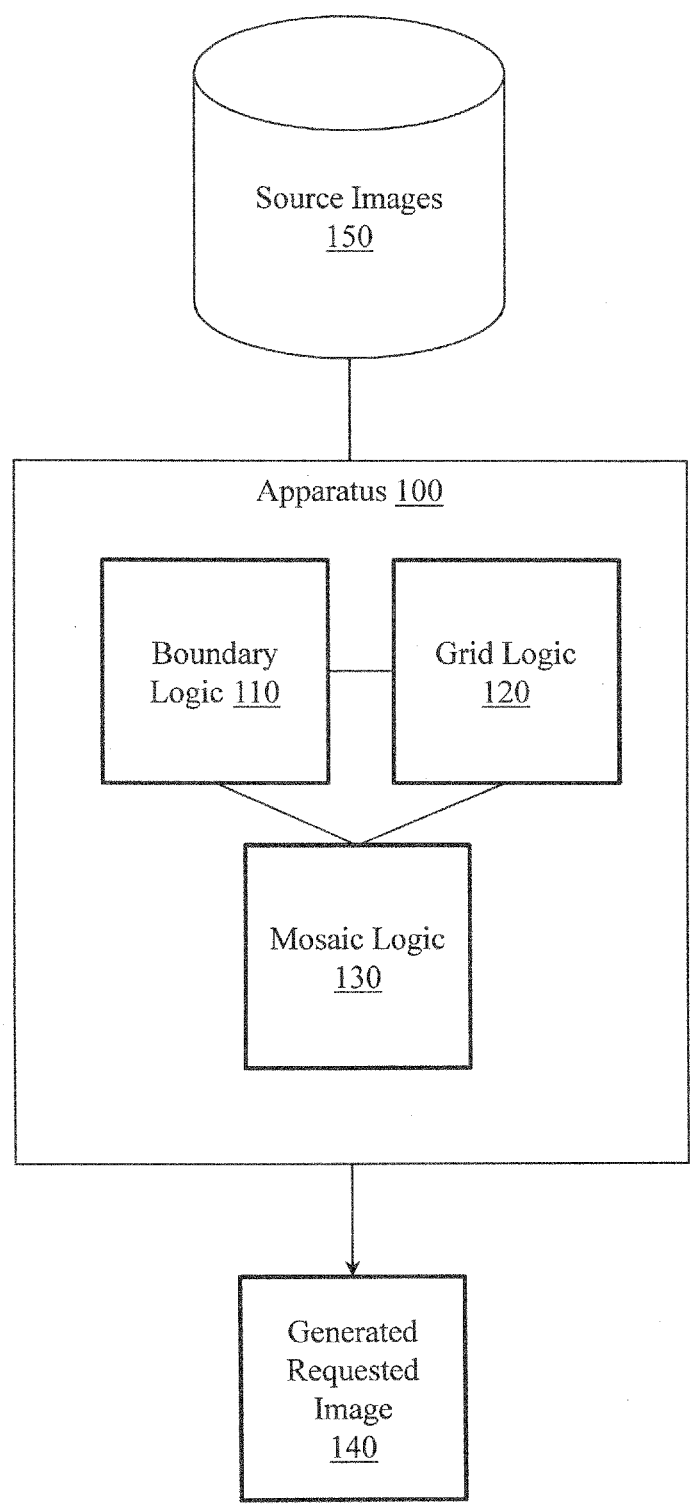
FIG. 1 illustrates one embodiment of an apparatus associated with generating a mosaic image using a virtual grid.

With reference to FIG. 1, one embodiment of an apparatus 100 associated with generating a mosaic image using a virtual grid is illustrated. The apparatus 100 is, for example, a computer, server, smart phone, or other electronic device that can process a plurality of source images to form a mosaic image. The apparatus 100 includes at least boundary logic 110, grid logic 120, and mosaic logic 130. The apparatus 100 may also include other computer components (not shown) such as a processor, memory, display, communication interface(s), and so on. In one embodiment, the boundary logic 110, grid logic 120 and mosaic logic 130 are configured to cause instructions to be executed by at least the processor to perform functions as disclosed herein.

In one embodiment, an image may be generated as follows. The apparatus 100 receives a query for a requested image 140 (i.e., a mosaic image) from an external device, a user, or, more generally, a process that requests a single mosaic image (i.e., requested image 140) that is composed of smaller source images. Upon completion, the apparatus 100 generates and outputs the requested image 140 as a mosaic image in electronic form and/or on a display. To build the requested image 140, in one embodiment, the apparatus 100 has access to a database or storage device that contains source images 150. The query may include one or more parameters that indicate information about the requested image 140. For example, the parameters can include a boundary of the requested image 140, a format for the requested image 140, an indicator for how to process (e.g., use an average of images, a newest of image, an oldest of image, etc.) overlapping portions within the requested image 140, and so on. In one embodiment, the parameters (e.g., boundary and/or algorithm) are predefined or are default parameters and are thus not included in the query.

The boundary of the requested image 140 is, for example, a border that defines dimensions and an interior area of the requested image 140. For example, the requested image 140 may be for a satellite image of a geographic location (e.g., a state, a city, or a city block). The boundary is defined by, for example, a user, algorithm, process, or more generally, any entity in order to limit an area of the requested image 140.

The boundary logic 110 is configured to analyze the boundary of the requested image 140 to determine which source images 150 are encompassed within the boundary. That is, the boundary logic 110 determines which of the source images 150 collectively form or cover an area that includes the requested image 140. In one embodiment, the boundary logic 110 queries a database that stores the source images 150 to determine which of the source images 150 are within the boundary of the requested image 140. For example, the database can include source images for the entire globe, which may include hundreds of thousands of source images 150. Accordingly, the boundary logic 110 is configured to query the database to determine which of the source images 150 to use when constructing the requested image 140 since an area of the requested image 140 is typically a subset of all the source images 150.

The source images 150 within the boundary of the requested image 140 can and often do include images that overlap in part, or at times, in whole. Accordingly, in one embodiment, the grid logic 120 is configured to generate a virtual grid and use the virtual grid to create a map that indicates which portions of the source images 150 overlap. By using the map of overlapping portions of the source images 150 the mosaic logic 130 can generate the requested image 140 by, for example, retrieving overlapping portions that are more recent than other overlapping portions, and so on.

Figure 2:
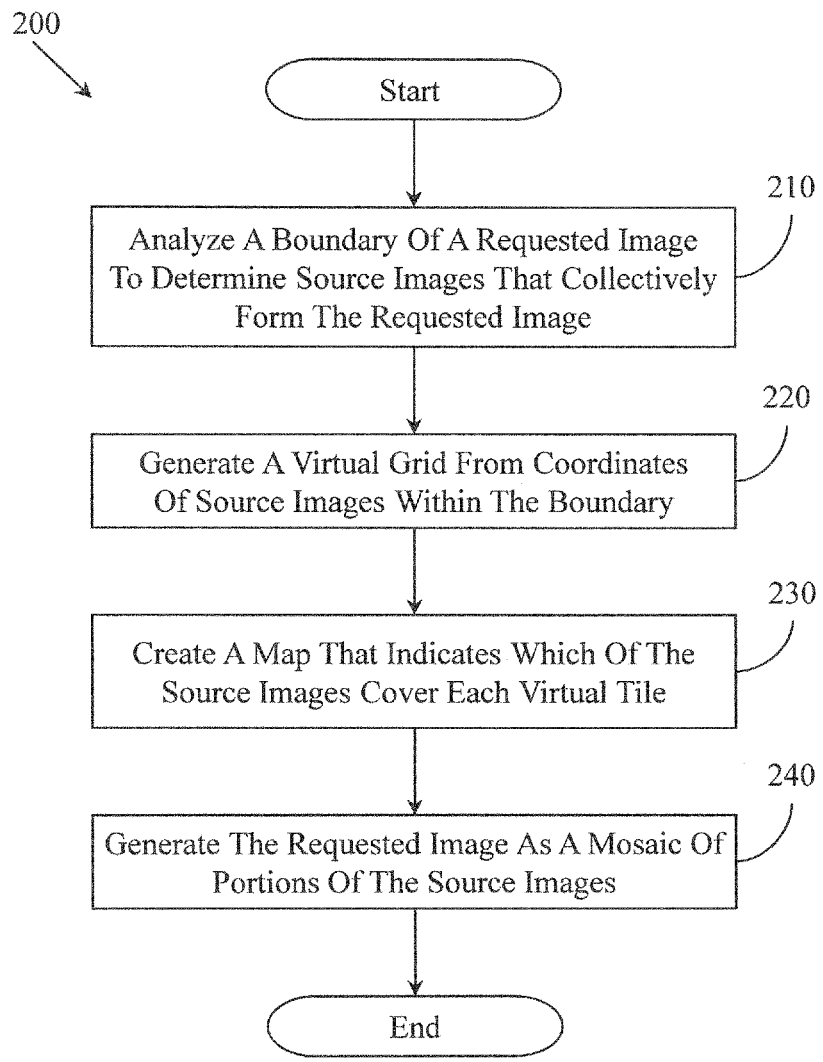
FIG. 2 illustrates another embodiment of a method associated with generating a mosaic image using a virtual grid.
Figure 3A:
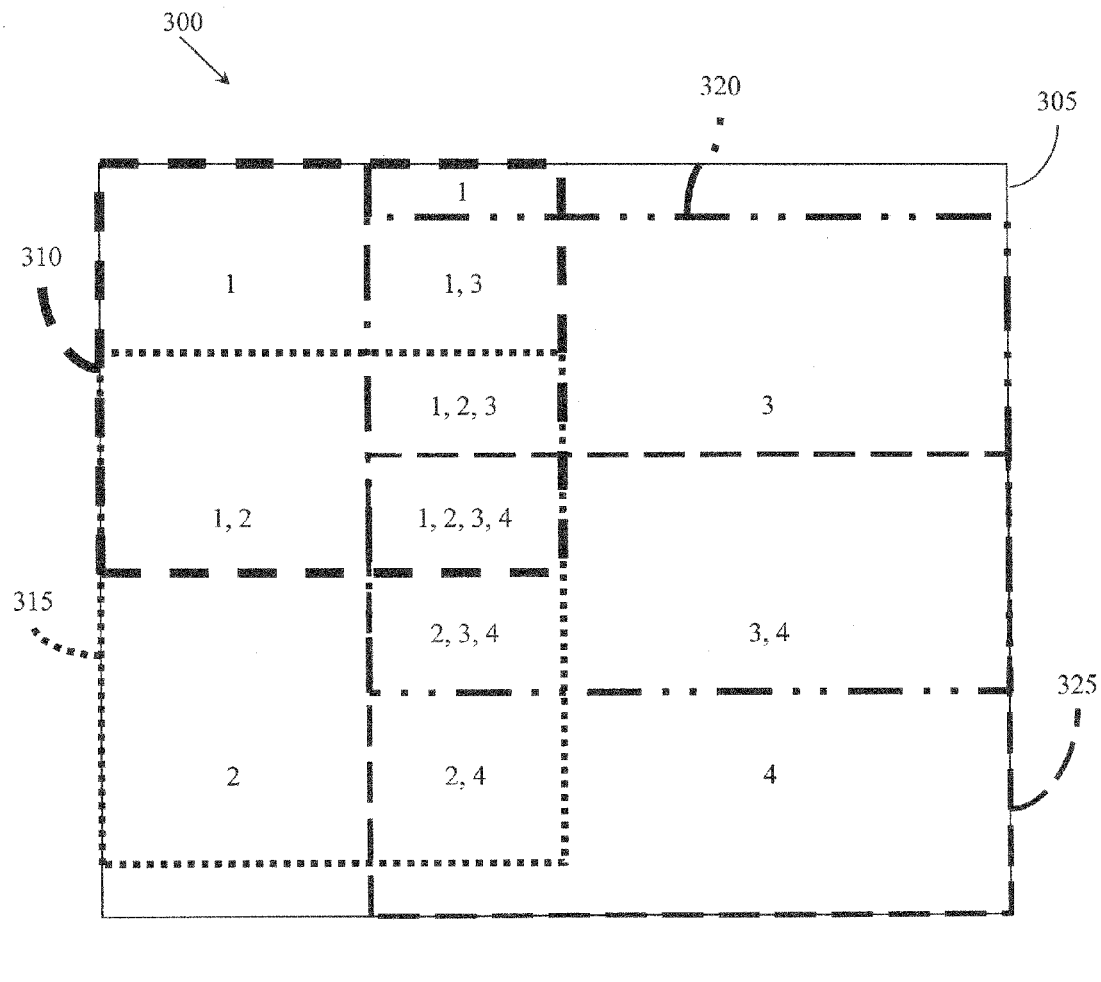
FIG. 3A illustrates a boundary of a requested image that is formed with four source images.
Figure 3B:
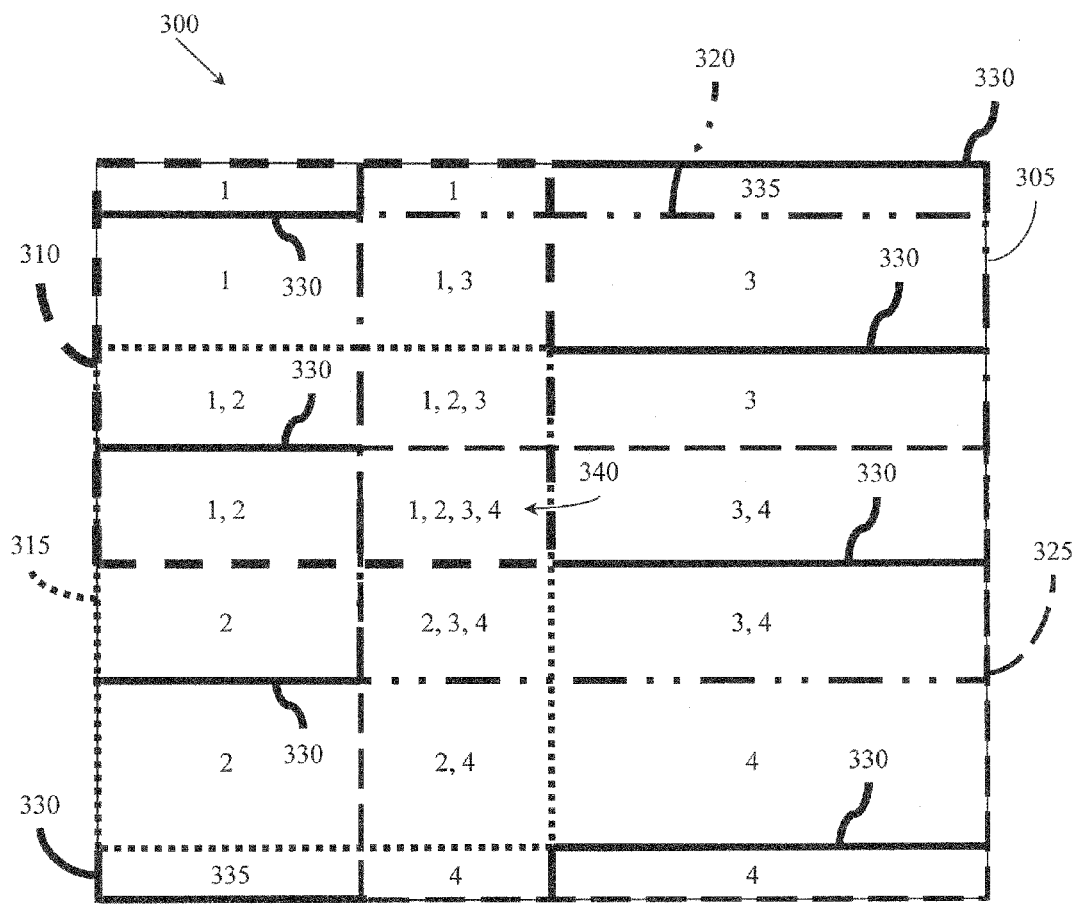
FIG. 3B shows FIG. 3A with one example of a virtual grid 300 generated from the four source images.
Figure 4:
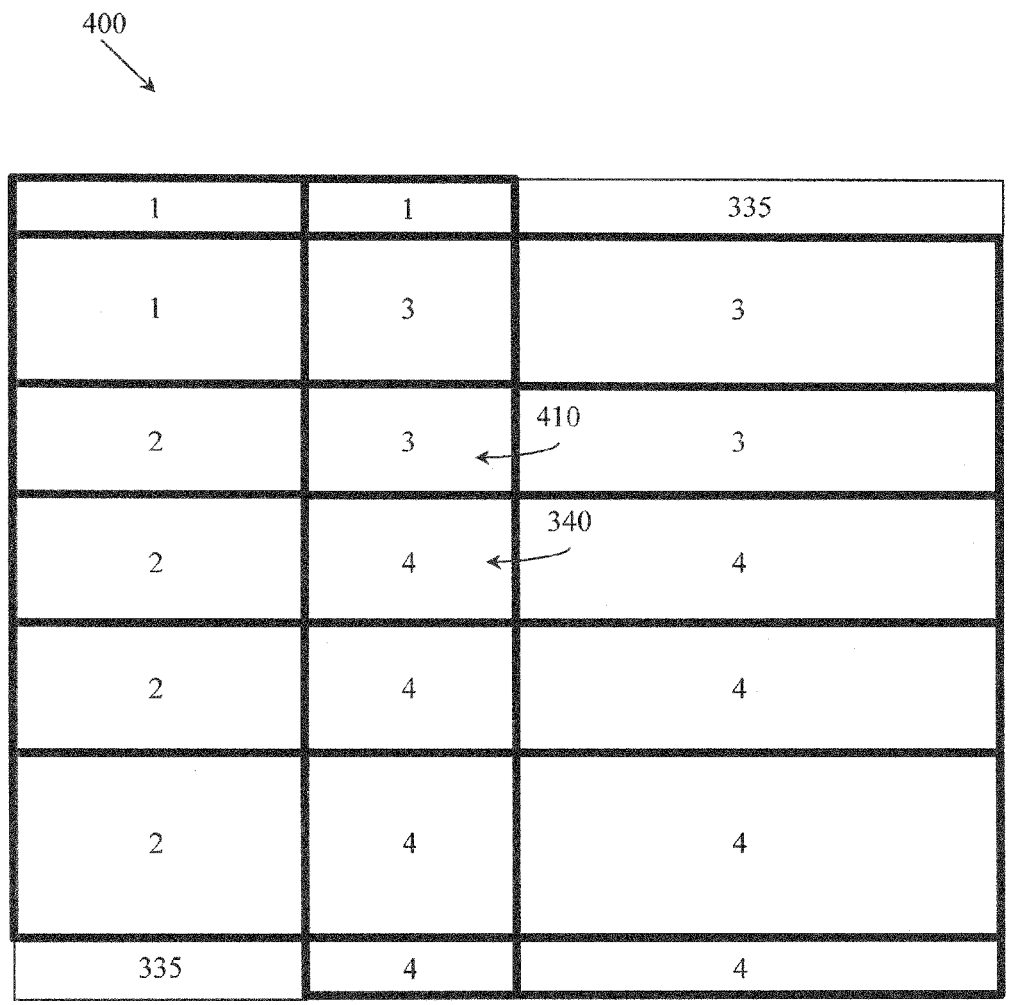
FIG. 4 illustrates one example of a virtual grid with selected portions of source images.

Further details of generating mosaic images will be discussed with reference to FIG. 2. FIG. 2 illustrates a method 200 associated with using a virtual grid to generate mosaic images. FIG. 2 will be discussed from the perspective of the apparatus 100 of FIG. 1. Additionally, FIGS. 3A, 3B, and 4 will be discussed along with method 200 of FIG. 2. FIG. 3A illustrates a boundary of a requested image that is formed with four source images. FIG. 3B shows FIG. 3A with one example of a virtual grid 300 generated from the four source images. FIG. 4 illustrates one example of selected portions 400 of source images 150 used to generate the requested image 140.

At 210, the apparatus 100 analyzes a boundary of a requested image 140. The boundary is an outline/border of the requested image 140. In one embodiment, the apparatus 100 analyzes the boundary to determine which of the source images 150 collectively form an area that includes the requested image 140. That is, the apparatus 100 determines which of the source images 150 comprise the requested image 140.

For example, the source images 150 can include thousands of different images that span a large area that includes images for areas outside of the boundary of the requested image 140. The source images 150 are, for example, geospatial images, raster data type images (e.g., 3D pixel images), and so on. Accordingly, in one embodiment, the apparatus 100 queries a database or other storage device that stores the source images 150 by providing coordinates of the boundary. In this way, the apparatus 100 can determine which of the source images 150 to use when generating the requested image 140. However, the apparatus 100 does not retrieve the source images 150 at this time. Instead, the apparatus 100 retrieves information about the source images 150 within the boundary. In one embodiment, the information includes coordinates of individual images of the source images and so on. The coordinates are, for example, three-dimensional coordinates in a three-dimensional raster space, geospatial coordinates or other coordinates that locate each source image.

With reference to FIG. 3A, for example, a boundary 305 of the requested image 140 is shown in FIG. 3A as the outer most border of the illustrated rectangle. Within the boundary 305 are four source images (310, 315, 320, and 325) that were determined to be within and/or form the boundary 305 of the requested image. Each of the source images 310-325 are displayed in FIGS. 3A and 3B with their edges having different styles of dashed lines so that each image can be visually distinguished for the discussion. Accordingly, for the requested image 140, the apparatus 100 receives information (e.g., coordinates) about the source images 310-325 since the source images 310-325 are images that collectively form an area of the requested image 140.

Also displayed in FIGS. 3A and 3B are reference numbers that identify which image is part of each overlapping area in the boundary 305. For example, the upper left most area includes a "1" that designates that image 1 is the only image that is part of that area. The area with "3, 4" means that portions of image 3 and image 4 overlap that area. The area with "1, 2, 3, 4" means that portions of images 1, 2, 3, and 4 overlap that area. These areas will be discussed further with reference to the virtual grid.

With reference again to FIG. 2, at 220, the virtual grid 300 is generated from the coordinates of each of the source images 310-325 within the boundary 305 of the requested image 140. For example, the apparatus 100 uses the coordinates to determine where, within the boundary 305, each of the source images 310-325 are located. In one embodiment, the apparatus 100 transforms the coordinates (i.e., geospatial coordinates) for each image into a spatial reference system of the requested image 140. The spatial reference system is a coordinate system that is particular to the requested image 140. The spatial reference system simplifies geospatial coordinates associated with the requested image 140 and the source images 310-325 in order to generate the virtual grid. In one embodiment, the spatial reference system of the requested image 140 correlates the source images 310-325 with pixels in the requested image 140.

Accordingly, the apparatus 100 is configured to use the coordinates of the individual source images 310-325 to determine local coordinates for each of the source images 310-325 within the boundary 305. In this way, the apparatus 100 locates edges of each of the source images and, for example, projects the edges (horizontally and vertically) toward the boundary 305. The projected edges are then used as grid lines that define rows and columns that form virtual tiles in the virtual grid 300.

FIG. 3B illustrates the images from FIG. 3A with each horizontal and vertical edge projected out to the exterior boundary 305. Each projected edge is labeled as a grid line 330. The vertical lines define columns within the boundary 305 and the horizontal lines define rows. As illustrated, seven rows and three columns that are defined by eight row grid lines and five column grid lines. The apparatus 100 defines the row grid lines as a function of top and bottom edges of the source images 310-325. The apparatus 100 defines column grid lines as a function of left and right edges of the source images 310-325. In one embodiment, the apparatus 100 projects the edges (as seen in projected lines 330) of each source image to reach the boundary 305 or another row or column line to form the grid lines. In this way, the apparatus 100 generates the virtual grid 300 using edges of each of the source images 310-325 and projections 330. Each rectangular area in the virtual grid (defined by a row and a column intersection) defines a virtual tile.

At 230, the apparatus 100 creates a map that indicates which of the source images 150 cover each of the virtual tiles. In one embodiment, the apparatus 100 creates the map by indicating on the map which of the virtual tiles are covered by which of the source images 310-325. Virtual tiles can be covered by one or more of the source images 310-325. Thus, the apparatus 100 can indicate multiple source images within each of the virtual tiles. Additionally, in one embodiment, one or more of the virtual tiles may not be covered by any of the source images 150 resulting in a blank space in the requested image 140.

For example, in FIG. 3B, each virtual tile is displayed with an indicator of which of the source images 310-325 cover each tile. As explained previously, a "1" means that the labeled tile is covered only by portions of image 1. A "3, 4" means that the labeled tile is covered by portions from images 3 and 4. Tiles that are not covered by any images are labeled as 335 (e.g., top right corner and lower left corner). Virtual tile 340, is labeled "1, 2, 3, 4" since it is covered by portions from all of the source images 310-325. Accordingly, the map provides a detailed indicator of which source images 310-325 cover each portion of the requested image 140.

With reference again to FIG. 2, at 240, the apparatus 100 generates the requested image 140 as a mosaic of portions of the source images 150. In one embodiment, the apparatus 100 uses the map as a guide when constructing the requested image 140. For example, the apparatus 100 uses the map to identify, which portions of which source images 310-325 to retrieve from a database.

As an example, consider FIG. 4, which illustrates a grid 400 that represents the virtual grid 300 of FIG. 3B after being processed at 240. The grid 400 includes mosaic tiles (e.g., each individual rectangular area) which correlate with virtual tiles from FIG. 3B. However, in FIG. 4 the mosaic tiles display which of the source images 310-325 (i.e., image 1-4) were used by the apparatus 100 to fill each tile. In the example illustrated in FIG. 4, the apparatus 100 has applied an algorithm to process overlaps that selects an image that is most recent. Further consider that source image 325 (i.e., image 4) is the most recent source image, followed by source image 320 (i.e., image 3), source image 315 (i.e., image 2), and lastly source image 310 (i.e., image 1) is the oldest.

Accordingly, when the apparatus 100 processes, for example, the virtual tile 340 from FIG. 3B, the source image 325 (i.e., image 4) is the most recent image that correlates with the virtual tile 340 even though all four source images 310-325 overlap the virtual tile 340. Thus, the apparatus 100 retrieves a portion of the source image 4 (image 325) that correlates with the virtual tile 340 to use for that portion of the requested image 140 when constructing the mosaic. Data from images 1, 2, or 3 are not used even though those images overlapped the tile 340. Similarly, the apparatus 100 selects the source image 320 (i.e., image 3) for virtual tile 410 since the source image 320 is the most recent image that covers the virtual tile 410. The apparatus 100 analyzes each virtual tile in the grid 300 at 240 in a similar manner.

While selection of a most recent image for virtual tiles with overlapping source images is discussed, overlaps can be processed in different ways. In one embodiment, the apparatus 100 can be configured to average all source images that overlap a virtual tile, to select the oldest source image, and so on. Accordingly, the apparatus 100 can generate the requested image 140 by retrieving a less-than-whole portion of at least one of the source images to include as part of the requested image 140 when, for example, selecting between images that overlap by selecting a newest image. Additionally, the apparatus 100 can generate the requested image 140 by writing the requested image 140 only once since only one of the overlapping images may be retrieved and written, or each pixel of the requested image may be computed in memory using overlapping images before being written. In this way, the apparatus 100 increases an efficiency of producing the requested image 140 by retrieving and writing less data.

Figure 5:
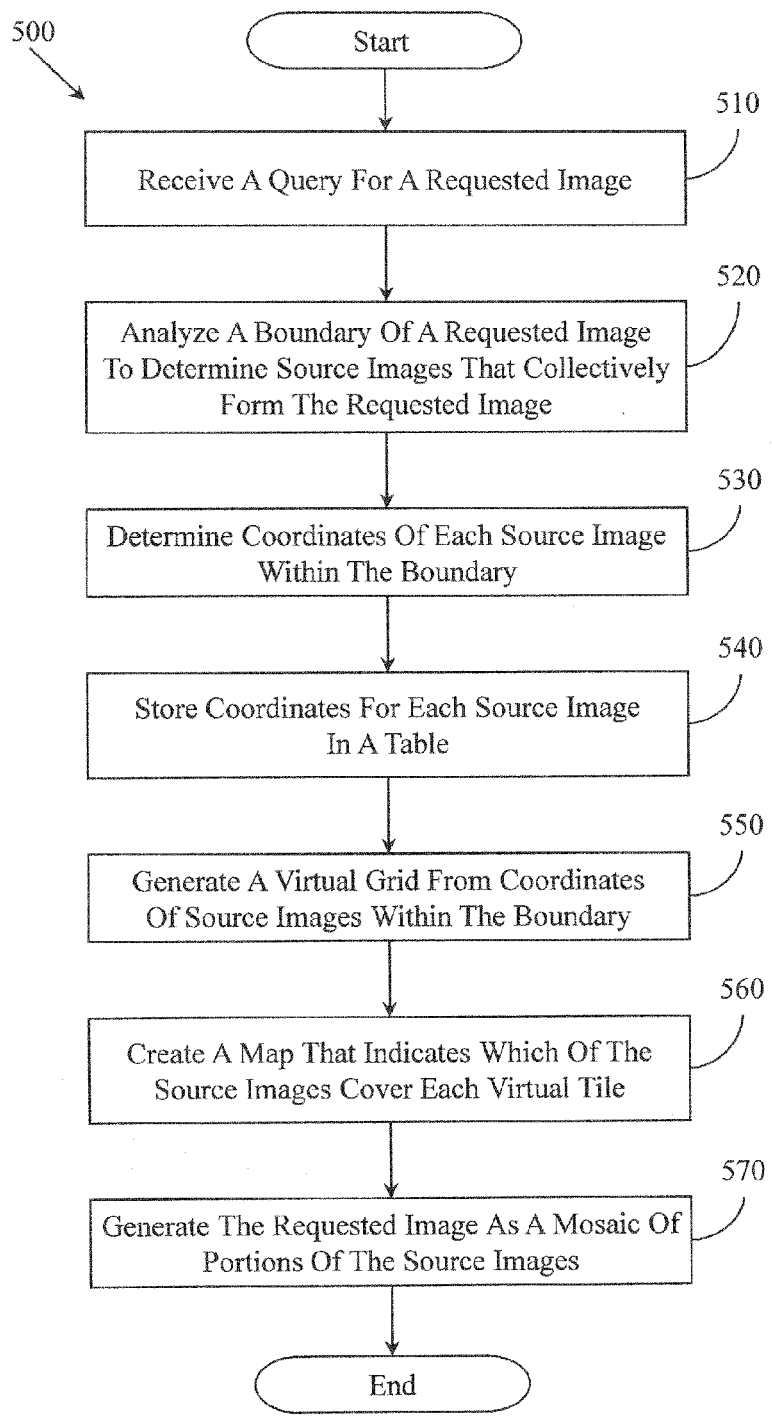
FIG. 5 illustrates another embodiment of a method associated with generating a mosaic image using a virtual grid.

FIG. 5 illustrates another embodiment of a method 500 associated with using a virtual grid to generate a mosaic image. FIG. 5 will be discussed from the perspective of the apparatus 100 of FIG. 1. Additionally, FIG. 5 includes elements similar to elements from the method 200. For example, blocks 520, and 550-570 are similar to blocks 210-240 of FIG. 2.

At 510, the apparatus 100 receives a query for the requested image 140. In one embodiment, the query includes parameters about the requested image 140. For example, the parameters include a boundary (e.g., the boundary 305) of the requested image 140. The boundary is, for example, defined by coordinates that identify a location of the requested image and an area of the requested image 140. In general, the coordinates can be geospatial coordinates, three-dimensional raster coordinates, and so on. The geospatial coordinates can include coordinates for an upper left corner and a lower right corner of the requested image 140 when, for example, the boundary is a rectangle. However, in another embodiment, the coordinates may include many points that are needed to define the boundary. For example, when the coordinates are three-dimensional coordinates similar coordinates as the geospatial coordinates may be provided in addition to a third coordinate to account for the additional dimension.

Additionally, the parameters can also include parameters about how to process the requested image 140. That is, the parameters can include an identifier of a specific algorithm or configuration to use when processing the requested image 140. For example, the algorithm/configuration is an algorithm/configuration for processing overlaps between the source images 150. Thus, the parameters can specify whether the algorithm/configuration is an algorithm/configuration that remedies the overlap by selecting a newest image, by averaging the source images in the overlap portion, and so on. In general, the parameters indicate how the apparatus 100 is to process the source images 150 into the requested image 140.

In response to receiving the query, at 510, the apparatus 100 analyzes the boundary from the query at 520. In one embodiment, the apparatus 100 is configured to analyze the boundary to determine source images from a database of source images 150 that collectively form the requested image 140. For example, the apparatus 100 uses the coordinates from the query that define the boundary to query the database. A result of the query provides the apparatus 100 with a list or other indicator of which source images 150 form the requested image 140. The requested image 140 is generally composed of a plurality of the source images 150. For example, a source image of the source images 150 can be wholly within the boundary of the requested image 140 or only partially extending into the boundary of the requested image 140. In either case, the apparatus 100 determines all of the source images that are within the boundary whether in whole or in part.

Accordingly, at 530, the apparatus 100 determines coordinates of each source image identified at block 520. In one embodiment, the coordinates are geospatial coordinates procured by the apparatus 100 by querying the database. The apparatus 100 is configured to translate the geospatial or other coordinates into a coordinate system (i.e., a spatial reference system) of the requested image 140. For example, the apparatus 100 translates geospatial coordinates into raster pixel coordinates of the requested image 140. The raster pixel coordinates are integer values in the spatial reference system, which are, for example, less complex than the geospatial coordinates and provide a common reference system for placing source images within the boundary of the requested image 140. In this way, the apparatus 100 can correlate a position of each source image with a location within the boundary of the requested image 140.

At 540, the apparatus 100 stores the coordinates from 530 into a table in a database. In this way, the apparatus 100 can query the coordinates at 550 to generate a virtual grid. For example, the apparatus 100 queries the coordinates stored in the table to determine locations for edges of each of the source images within the boundary of the requested image 140. The apparatus 100 uses the edges to construct vertical column lines and horizontal row lines by projecting (e.g., grid projections 330 of FIG. 3B) each edge of each source image to the boundary of the requested image 140. In this way, the apparatus 100 constructs a virtual grid with rows and columns that define virtual tiles. In turn, the virtual tiles define portions of the requested image 140 that are covered by one or more of the source images 150.

At 560, the apparatus 100 creates a map using the virtual tiles in the virtual grid. In one embodiment, the apparatus 100 creates the map by identifying which of the source images 150 cover each of the virtual tiles. By generating the map, the apparatus 100 creates a record of which portions of which source images 150 cover each virtual tile of the requested image 140. Consequently, at 570, the apparatus 100 uses the map to generate the requested image 140 as a mosaic of portions of the source images 150 as defined by the virtual tiles and the map.

For example, the apparatus 100 generates the requested image 140 by analyzing each of the virtual tiles of the map and selecting a portion of a source image that correlates with each virtual tile as defined by the map. In this way, the apparatus 100 does not retrieve whole source images from the database when generating the requested image 140, but instead retrieves only a portion of a source image that correlates with a virtual tile. Image data from other source images that also overlap the same virtual tile (e.g., duplicate data) can be ignored and not retrieved. Thus data processing may be reduced by not retrieving duplicate data from other images. Additionally, the apparatus 100 writes the requested image 140 only once using retrieved portions of the source images 150. That is, the apparatus 100 does not retrieve multiple source images for a virtual tile with multiple overlapping source images and write each of the source images to the requested image 140. Instead, the apparatus 100 uses the map to identify which portions overlap and individually processes the overlapping virtual tiles by retrieving only portions necessary to perform processing as specified by the parameters from the original query for the requested image 140.

Additionally, in one embodiment, the apparatus 100 may be configured to perform method 500, in parallel, on a large number of images in a database. That is, the apparatus 100 uses an entire area covered by all source images in a database as the requested image 140. Accordingly, the apparatus 100 generates a virtual grid for the entire area and stitches all of the source images together to form a single mosaic image as the requested image 140. Furthermore, the apparatus 100 can subdivide the whole of the requested image 140 and perform the method 500 at block 570 in parallel on each subdivided portion.

Figure 6:
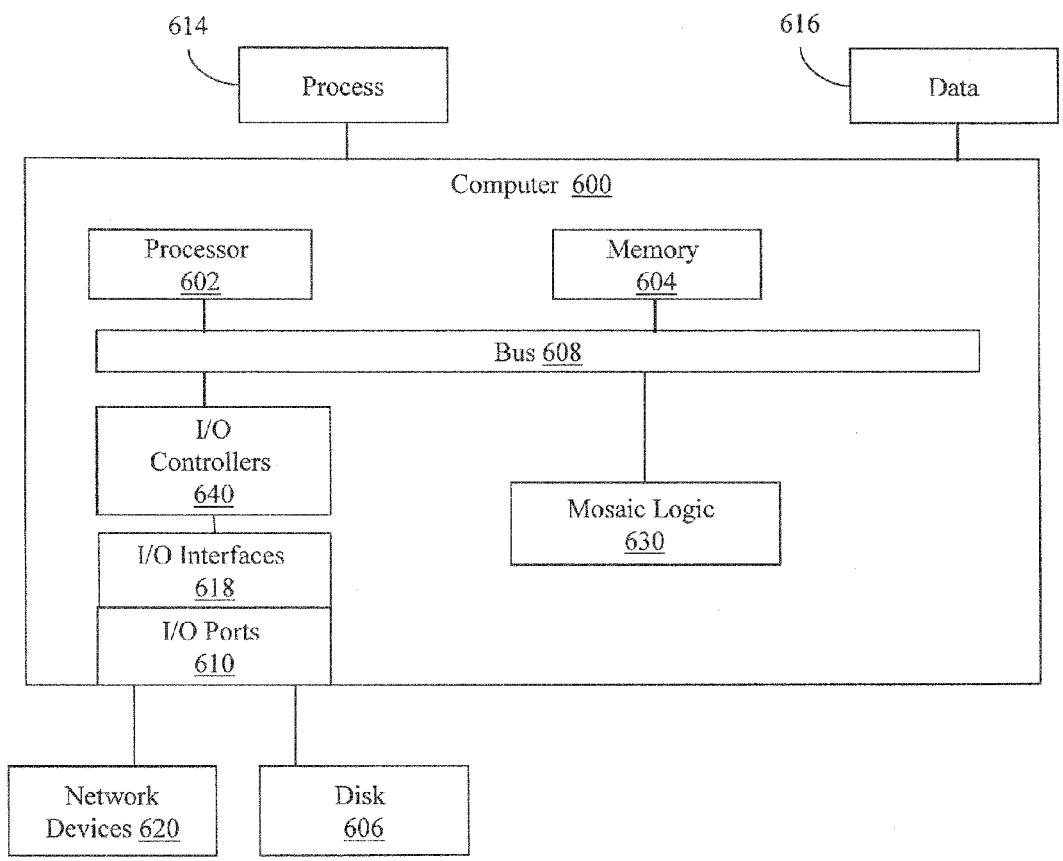
FIG. 6 illustrates an embodiment of a computing system in which example systems and methods, and equivalents, may operate.

FIG. 6 illustrates an example computing device in which example systems and methods described herein, and equivalents, may be implemented in and operate. The example computing device may be a computer 600 that includes a processor 602, a memory 604, and input/output ports 610 operably connected by a bus 608. In one example, the computer 600 is configured with mosaic logic 630 configured to generate a mosaic image using a virtual grid as described herein. In different examples, the mosaic logic 630 may be implemented in hardware, a non-transitory computer-readable medium with stored instructions, firmware, and/or combinations thereof. While the logic 630 is illustrated as a hardware component attached to the bus 608, it is to be appreciated that in one example, the logic 630 could be implemented in the processor 602.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the I/O interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the I/O interfaces 618, and/or the I/O ports 610. Through the network devices 620, the computer 600 may interact with a network. Through the network, the computer 600 may be logically connected to remote computers. Networks with which the computer 600 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Logic", as used herein, includes hardware, firmware, a non-transitory computer readable medium that stores instructions, and/or combinations of each to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

What is claimed is:

1. A non-transitory computer-readable medium storing computer-executable instructions that when executed by a computer cause:

analyzing, by at least a processor, a boundary of a requested image to determine source images that collectively form an area that includes at least a portion of the requested image;

generating, by at least the processor, a virtual grid from coordinates of each of the source images within the boundary by identifying edges of each of the source images from the coordinates to define rows and columns of the virtual grid within the boundary, and wherein the rows and columns of the virtual grid define virtual tiles in the virtual grid;

creating, by at least the processor, a map that indicates which of the source images cover each of the virtual tiles; and generating, by at least the processor, the requested image as a mosaic of portions of the source images constructed based, at least in part, on the map.

2. The non-transitory computer-readable medium of claim 1, further comprising instructions that when executed by the computer cause:

receiving, prior to analyzing the boundary, a query for the requested image, wherein the query includes parameters that define the boundary of the requested image.

3. The non-transitory computer-readable medium of claim 2, wherein the parameters include mosaicking parameters that define an algorithm for processing virtual tiles that include overlaps between the source images, and wherein generating the virtual grid includes generating the virtual grid with irregular width columns and rows according to the edges of each of the source images.

4. The non-transitory computer-readable medium of claim 1, further comprising instructions that when executed by the computer cause:

prior to generating the virtual grid:
determining the coordinates of each of the source images that are within the boundary of the requested image; and
storing the coordinates in a table, wherein generating the virtual grid from the coordinates includes constructing the virtual grid based, at least in part, on querying the table to identify the rows and columns that define the virtual tiles according to edges of the source images.

5. The non-transitory computer-readable medium of claim 1, wherein creating the map includes indicating on the map which of the virtual tiles are covered by at least two of the source images, and wherein virtual tiles covered by at least two of the source images are overlap tiles.

6. The non-transitory computer-readable medium of claim 5, wherein generating the requested image as a mosaic of portions of the source images includes using an algorithm to generate portions of the requested image that correlate with the overlap tiles, and wherein the algorithm selects a source image that is a newest image for the overlap tiles or the algorithm averages source images for the overlap tiles.

7. The non-transitory computer-readable medium of claim 1, wherein the virtual grid correlates the source images with pixels in the requested image, and wherein generating the virtual grid includes transforming coordinates of the source images into the coordinates of the virtual grid, wherein the coordinates of the virtual grid are integer values in a spatial reference system of the requested image.

8. The non-transitory computer-readable medium of claim 1, wherein the source images are geospatial images or raster data types, and wherein the source images are three-dimensional images.

9. The non-transitory computer-readable medium of claim 1, wherein generating the requested image includes retrieving a less-than-whole portion of at least one of the source images to include as part of the requested image and wherein generating the requested image includes writing the requested image only once.

10. An apparatus, comprising:
boundary logic configured to analyze a boundary of a requested image to determine source images that collectively form an area that includes at least a portion of the requested image;
grid logic configured to:
generate a virtual grid from coordinates of each of the source images by identifying edges of each of the source images from the coordinates to define rows and columns of the virtual grid within the boundary,
create a map that indicates which of the source images cover each of the virtual tiles, wherein the rows and columns of the virtual grid define virtual tiles in the virtual grid; and
mosaic logic configured to generate the requested image as a mosaic of portions of the source images constructed based, at least in part, on the map.

11. The apparatus of claim 10, wherein the grid logic is configured to:
prior to generating the virtual grid:
determine the coordinates of each of the source images that are within the boundary of the requested image, and
store the coordinates in a table, wherein the grid logic is configured to generate the virtual grid from the coordinates by constructing the virtual grid based, at least in part, on querying the table to identify the rows and columns that define the virtual tiles, wherein the grid logic is configured to generate the virtual grid by generating the virtual grid with irregular width columns and rows according to the edges of each of the source images.

12. The apparatus of claim 10, wherein the grid logic is configured to create the map by indicating on the map which of the virtual tiles are covered by at least two of the source images, wherein virtual tiles of the virtual tiles covered by at least two of the source images are overlap tiles, wherein the mosaic logic is configured to generate the requested image as a mosaic of portions of the source images by using an algorithm to generate portions of the requested image that correlate with the overlap tiles.

13. The apparatus of claim 10, wherein the virtual grid correlates the source images with pixels in the requested image, and wherein generating the virtual grid includes transforming coordinates of the source images into the coordinates of the virtual grid, wherein the source images are geospatial images, and wherein the coordinates are three-dimensional coordinates and are integer values in a spatial reference system.

14. The apparatus of claim 10, wherein the mosaic logic is configured to generate the requested image according to parameters that define an algorithm for processing virtual tiles that include overlaps between the source images, and wherein the apparatus is configured to receive the parameters as part of a query for the requested image.

15. A method, comprising:
analyzing, by a processor of an apparatus, a boundary of a requested image to determine source images that collectively form an area that includes at least a portion of the requested image; and
generating, by the processor, a virtual grid from coordinates of the source images by identifying edges of the source images from the coordinates to define rows and columns of the virtual grid within the boundary, wherein the rows and columns of the virtual grid define virtual tiles in the virtual grid.

16. The method of claim 15, further comprising:
receiving, by the processor prior to analyzing the boundary, a query for the requested image, wherein the query includes parameters that define the boundary of the requested image;
creating, by the processor, a map that indicates which of the source images cover each of the virtual tiles; and
generating, by the processor, the requested image as a mosaic of portions of the source images constructed based, at least in part, on the map.

17. The method of claim 15, wherein mosaicking parameters define an algorithm for processing virtual tiles that include overlaps between the source images, wherein generating the virtual grid includes generating the virtual grid with irregular width columns and rows according to the edges of each of the source images.

18. The method of claim 15, wherein generating the virtual grid correlates the source images with pixels in the requested image, wherein generating the virtual grid includes transforming spatial extent coordinates of the source images into the coordinates of the virtual grid, and wherein the coordinates of the virtual grid are integer values in a spatial reference systems of the requested image.

19. The method of claim 15, wherein the source images are geospatial images or raster data types, and wherein the source images are three-dimensional images.

20. The method of claim 15, wherein generating the requested image includes retrieving a less-than-whole portion of at least one of the source images to include as part of the requested image and wherein generating the requested image includes writing the requested image only once.

21. A non-transitory computer-readable medium storing computer-executable instructions that when executed by a computer cause
analyzing, by a processor of the computer, a boundary of a requested image to determine source images that collectively form an area that includes at least a portion of the requested image; and
generating, by the processor, a virtual grid from coordinates of the source images by identifying edges of the source images from the coordinates to define rows and columns of the virtual grid within the boundary, wherein the rows and columns of the virtual grid define virtual tiles in the virtual grid.

* * * * *